United States Patent
Dittrich et al.

(10) Patent No.: US 6,268,421 B1
(45) Date of Patent: Jul. 31, 2001

(54) REINFORCEMENT ADDITIVES

(75) Inventors: Uwe Dittrich, Radebeul; Huhn Guenter, Marl; Hans-Guenther Srebny, Duelmen; Katrin Marschner, Nuenchritz, all of (DE)

(73) Assignee: Huels AG, Marl (DE)

( * ) Notice: Subject to any disclaimer, the term of this patent is extended or adjusted under 35 U.S.C. 154(b) by 0 days.

(21) Appl. No.: 08/647,889

(22) PCT Filed: Sep. 22, 1995

(86) PCT No.: PCT/EP95/03735

§ 371 Date: Oct. 2, 1996

§ 102(e) Date: Oct. 2, 1996

(87) PCT Pub. No.: WO96/10604

PCT Pub. Date: Apr. 11, 1996

(30) Foreign Application Priority Data

Oct. 1, 1994 (DE) .................................. 44 35 311

(51) Int. Cl.$^7$ ...................................... C08K 5/24
(52) U.S. Cl. .................. 524/266; 524/261; 524/265; 524/420; 423/449.7
(58) Field of Search .................................. 524/261, 265, 524/266, 420; 423/449.7

(56) References Cited

U.S. PATENT DOCUMENTS

| 3,947,436 | * | 3/1976 | Rocktaschel et al. | 260/249.5 |
| 4,076,550 | * | 2/1978 | Thurn et al. | 106/288 |
| 5,159,009 | * | 10/1992 | Wolff et al. | 525/332.5 |

FOREIGN PATENT DOCUMENTS 298 252 A5 * 2/1992 (DE) .

* cited by examiner

*Primary Examiner*—Robert Dawson
*Assistant Examiner*—Marc S. Zimmer
(74) *Attorney, Agent, or Firm*—Oblon, Spivak, McClelland, Maier & Neustadt, P.C.

(57) ABSTRACT

The invention concerns reinforcement additives consisting of oligomeric and/or polymeric sulfur-containing organoorganooxysilanes, perhaps other unsaturated hydrocarbon-containing organoorganooxysilanes and reinforcing semiactive, active, and/or highly active carbon blacks, common in rubber, their production, and the use of the additives in perhaps silicatically filled vulcanizable rubber mixtures and compositions and in plastic mixtures or in carbon black dispersions.

10 Claims, No Drawings

REINFORCEMENT ADDITIVES

TECHNICAL FIELD

The invention concerns reinforcement additives consisting of oligomeric or polymeric sulfur-containing organoorganooxysilanes, perhaps other unsaturated hydrocarbon-containing organoorganooxysilanes, reinforcing, semiactive, active, and/or highly active carbon blacks, which are common in rubber, and perhaps other known additives, and the preparation and use of the additives in accordance with the invention in vulcanizable, perhaps silicatically [sic] filled rubber mixtures and compositions, and in plastic mixtures, or in carbon black dispersions.

STATE OF THE ART

The use of sulfur-containing organosilanes in silica-filled rubbers to establish a chemical bond between rubber helices and a silica surface has been known for a long time.

Thus, a number of compounds in pure form have been proposed for these uses—for example, 3-mercaptopropyltrimethoxysilane (U.S. Pat. No. 5,126, 510; West German Patent No. 2,524,863);, 3-(triethoxysilyl) propylthiocyanate (West German Patent Nos. 2,035,778 and 4,100,217); bis[3-(triethoxysilyl)propyl]tetrasulfide (West German Patent Nos. 2,255,577, 2,447,614, and, 3,305,373; Japanese Patent No. 6 10 04 742), or oligo[(triethoxysilyl) organo]bisoligosulfides (East German Patent No. 299,187; European Patent No. 466,066).

The disadvantage in using these pure silanes is either the insufficient processing reliability due to increased mixing viscosities and the greatly reduced starting and completing vulcanization times or an insufficient reinforcer effect due to excessively low crosslinking densities. Another disadvantage is the difficult metering of the liquid additives and their susceptibility to hydrolysis, which has a negative effect, especially in processing in the rubber industry.

Experiments to use the aforementioned monomeric silanes as mixtures or preparations with silicatic fillers in the rubber, tire, and plastic industries, described, for example, in West German Patent Nos. 2,528,134, 3,314,742, and 3,437, 473, fail due to the susceptibility to hydrolysis, instability, or excessively low effectiveness of these mixtures.

A storage-stable silane-silica preparation based on bis[3-(triethoxysilyl) propyl]tetrasulfide is described in European Patent No. 442,143. For the preparation of this mixture, containing only 5 to 15 parts by weight silane, however, long mixing times (>2) and high temperatures (>100° C.) are required.

Furthermore, mixtures of bis[3-(triethoxysilyl)propyl] tetrasulfides and carbon blacks and their use in rubbers have been described in the past. Simple mixtures in the weight ratio of 50 to 50, cited, for example, in West German Patent No. 2,747,277 and U.S. Pat. No. 5,227,425, exhibit rather good reinforcing effects in silica-filled rubber mixtures, but at the same time lead to an impairment of the tear propagation resistance of the vulcanized materials and to a strong decline of the elongation at break due to a more rapid strengthening of the rubber. Furthermore, the silane fraction can be dissolved away completely from the carbon black by extraction, for example, with diethyl ether, which has a negative effect on the stability and effectiveness of the silane-carbon black mixtures.

Silane-carbon black preparations whose silane fraction cannot be dissolved away by extraction are presented in West German Patent Nos. 4,043,537 and 4,119,959. They are suitable only for purely carbon blackfilled rubber mixtures, however, because of their low silane-content (0.4 to 5.5 parts by weight) and are prepared according to an expensive method (temperature>120° C.). Even more expensive methods for the fixing of the monomeric silane bis[3-(triethoxysilyl)propyl]tetrasulfide on carbon blacks by upstream oxidation processes on the carbon black (plasma method, oxidation agents such as $H_2O_2$, nitric acid, ozone) are described in Japanese Patent No. 88 31796 and West German Patent No. 3,813,678. Here too, only one extractable silane fraction of 1 to 5 parts by weight is attained.

All these attempts to improve the rubber-technological characteristics begin with a variation of the carbon black or the treatment of its surface.

DESCRIPTION OF THE INVENTION

The goal of the invention was to prepare new, flowable, odorless, and dust-free reinforcement additives based on oligomeric and/or polymeric, sulfur-containing organoorganooxysilanes and reinforcing, semiactive, active, and/or highly active carbon blacks, common in the rubber, tire, and plastic industries, and a simple method for their preparation.

Another goal of the invention was the implementing of the use of additives in accordance with the invention in vulcanizable, perhaps silicatically filled rubber mixtures and compositions and in plastic mixtures or in carbon black dispersions.

Surprisingly, it was discovered that the aforementioned disadvantages can be overcome if the reinforcement additives consist of oligomeric and/or polymeric sulfur-containing organoorganooxysilanes, perhaps other unsaturated hydrocarbon-containing organoorganooxysilanes, reinforcing semiactive, active, and/or highly active carbon blacks common in rubber, and perhaps other known additives.

The object of the invention concerns reinforcement additives, consisting of a) 5 to 70, preferably 40 to 60, parts by weight of one or more oligomeric and/or polymeric sulfur-containing organoorganooxysilanes of the following general formula:

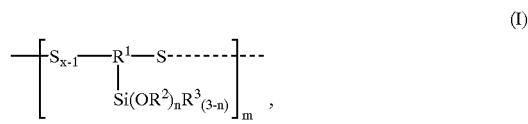

(I)

wherein $R^1$ represents saturated and/or unsaturated, branched, and/or unbranched, substituted and /or unsubstituted, at least trivalent hydrocarbons with 2 to 20 carbon atoms, provided that at least two carbon-sulfur bonds are contained; $R^2$ and $R^3$ denote, independent of one another, saturated and/or unsaturated, branched and/or unbranched, substituted and/or unsubstituted hydrocarbons with 1 to 20 carbon atoms, halogen, hydroxy, hydrogen, and groups of the following general formula:

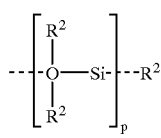

(II)

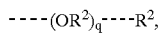

(III)

wherein $R^2$ has the definition indicated above and $n=1$ to 3, $m=1$ to 1,000, $p=1$ to 5, $q=1$ to 3, and $x=1$ to 8; and b) 30 to 95, preferably 40 to 60, parts by weight of one or more of the common reinforcing semiactive, active, and/or highly active carbon blacks.

Oligo/poly[4-(2-trialkoxysilylethyl)cyclohexane-1,2-diyl]bisoligosulfides of the following general formula:

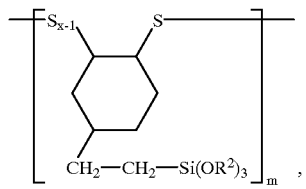

(IV)

wherein $R^2$, m, and x have the definitions indicated above, are preferably used as sulfur-containing organoorganooxysilanes.

Moreover, a number of other oligomeric and polymeric, sulfur-containing organoorganooxysilanes can, of course, be used.

Examples of such compounds are the following:

oligo/poly[5-triethoxysilyl)bicyclo[2.2.1]heptane-2,3-diyl]bisoligosulfides of the following general formula:

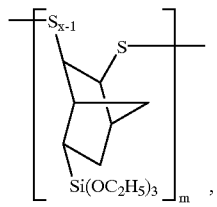

(VI)

oligo/poly[8,9-bis(triethoxysilyl)-endo-tricyclo[5.2.1.0$^{2.6}$]decane-3,4-diyl]bisoligosulfides of the following general formula:

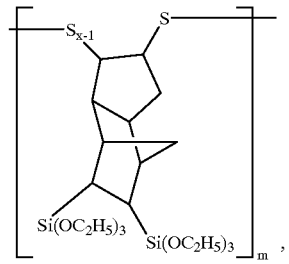

(VII)

oligo/poly[trialkoxysilyl)alkane-1,2-diyl]bisoligosulfides of the following general formula:

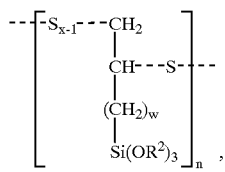

(VIII)

oligo/poly[1-(trimethoxyethoxysilyl)ethane-1,2-diyl]bisoligosulfides of the general formula:

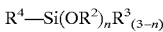

(IX)

oligo/poly[3,3,5,5-tetraethoxy-4-oxa-3,5-disilaheptane-1,2,6,7-tetrayl]tetrakisoligosulfides of the following general formula:

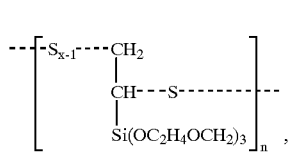

(X)

The values for x are 1 to 8, those for $m=1$ to 200.

The reinforcement additives in accordance with the invention can contain up to 20 parts by weight of one or more organoorganooxysilanes of the following general formula:

$$R^4-Si(OR^2)_n R^3_{(3-n)}$$ (V), wherein $R^2$, $R^3$, and n have the aforementioned definitions and $R^4$ represents unsaturated, branched, and/or unbranched, substituted and/or unsubstituted hydrocarbons with 2 to 20 carbon atoms and with at least one double bond of an olefinic or aromatic character.

Compounds of general formula (IV) are, for example, the following:

2-[(3-cyclohexen-1-yl)ethyl]trialkoxysilane, 2-(phenylethyl)trialkoxysilane, and/or, alkenyltrialkoxysilanes with up to 20 carbon atoms in the alkenyl group, wherein alkoxy=$OR^2$ with $R^2$ having the definition indicated above.

Furthermore, the sulfur-containing organoorganooxysilanes of general formula (I) can contain additives that are common in rubber, such as, for example, accelerators, crosslinking agents, and or free sulfur. It is, however, also possible to admix these additives separately.

In addition to the usual reinforcing furnace carbon blacks, channel black, thermal black, lampblack, acetylene black, and/or arcblack carbon blacks, as well as active carbon, are also used in the silane-carbon black mixtures in accordance with the invention.

For use in silicatically filled rubber mixtures, the silane-carbon black additives in accordance with the invention preferably consist of 40 to 60 parts by weight of the described organoorganooxysilanes and 40 to 60 parts by weight carbon blacks, common in rubber.

The object of the invention is also a method for the preparation of the reinforcement additives, described above, and in accordance with the invention, consisting of sulfur-containing oligomeric and/or polymeric silanes and carbon blacks, which is characterized by the fact that a) the oligomeric and/or polymeric, sulfur-containing organoorganooxysilanes of general formula (I);

b) the reinforcing semiactive, active, and/or highly active carbon blacks, and c) perhaps other additives are mixed in a common continuously or discontinuously operating mixing apparatus at room temperature, until the organoorganooxysilane is adsorbed on the carbon black and a nonadhesive granulated material is obtained.

Advantageously, the unsaturated hydrocarbon-containing organoorganosilanes of general formula (IV), just like the additives or free sulfur common in rubber, are added, as needed, to the sulfur-containing organoorganooxysilanes of general formula (I) before the mixing.

Someone skilled in the art is aware that oligomeric and polymeric silanes or siloxanes with carbon blacks rather produce adhesive or nongranulatable products or products that can be granulated only with difficulty. It was all the more surprising that when metering the oligomeric and/or polymeric, sulfur-containing organoorganooxysilanes to the carbon black present, it was possible to obtain a very readily processable, granulatable silane-carbon black batch after a short adsorption time.

Particularly advantageous characteristics of the silane-carbon black reinforcement additives in accordance with the invention are attained when using the compounds of general formulas (IV) and (VI) to (IX).

The silane-carbon black reinforcement additives in accordance with the invention are obtained as solid, flowable, odorless, dust-free, storage-stable silane-carbon black preparations, present in a narrow particle size distribution, in which the weight ratios are freely selectable in the ranges 5 to 70 parts by weight silane and 30 to 95 parts by weight carbon black.

Another object of the invention is the use of the reinforcement additives in accordance with the invention in vulcanizable rubber mixtures and compositions, plastic mixtures, and carbon black dispersions—that is, which can be crosslinked with sulfur or peroxides. In particular, silicatically filled rubber mixtures and compositions are preferred thereby.

The reinforcement additives in accordance with the invention are added to the silicatically filled rubber mixtures in quantities of 1 to 100 parts, preferably in a quantity of 2 to 50 parts, based on 100 parts rubber.

With the additives in accordance with the invention, it was possible to attain considerable advantages, in comparison to vulcanized materials in which the oligomeric and/or polymeric silanes were used without prior mixing with carbon black, or in comparison to vulcanized materials that contain traditional silanes, which are known for this application purposes, with or without carbon black. Thus, silicatically filled rubber mixtures that contained the reinforcement additive in accordance with the invention exhibit clearly improved physical-mechanical and dynamic coefficients, in addition to a high processing reliability. Unexpectedly, the tear resistance rather had a tendency to increase, and elongation at break and mixing viscosity did not reach any critical values.

Among the rubber types suitable for use with reinforcement additives in accordance with the invention are both the natural or synthetic rubbers and their mixtures, which can be crosslinked with sulfur and with peroxides. One can mention as examples here: styrene-butadiene rubber, natural rubber, EPDM rubbers, nitrile rubber, and polychloroprene.

As light reinforcement fillers, it is possible to use all light silicatic fillers, which are made of silicates and contain silicates and which are compatible with respect to rubber and can be worked into rubber mixtures, in particular natural, pyrogenic or precipitated silicas and synthetic or naturally occurring silicates.

Moreover, the rubber mixtures mixed with the reinforcement in accordance with the invention contain other known additives common in rubber, such as:

reinforcement carbon blacks (mentioned individually above), inactive fillers, such as calcium carbonates, chalks, talcs, or metal oxides, crosslinking agents and accelerator systems, vulcanization retarders, promoters, such as zinc oxide or stearic acid, plasticizers, in particular aromatic, paraffinic, naphthenic or synthetic mineral oils, ageing, light-protecting, ozone-protecting, fatigue, coloration. and processing auxiliaries, sulfur, in a quantity of 0.1 to 8 parts by weight per 100 parts by weight rubber.

The mixtures are prepared in the manner common in rubber in a closed mixer and/or on a rolling mill.

The reinforcement additives in accordance with the invention are used both in mixtures for the production of tires in the form of bearing surface, sidewall, adhesion, belt, carcass, and beaded ring mixtures and in mixtures for technical articles, for example, for hoses, sealings, conveyance belts, spring and damping elements or rubber-coated fabrics.

Previously known reinforcement additives permitted the firm binding of only a fraction between 0.5 and 5.5 wt % of the used silane to or on the carbon black. The remaining fraction could be dissolved out from the mixture by extraction, for example, with ether. Therefore, it was completely surprising that although the preparation was carried out at 25° C., 50 to 60 wt % of the silane fraction were bound to the carbon black and only 40 to 50 wt % could be extracted from the reinforcement additives in accordance with the invention.

The reinforcement additives in accordance with the invention are superior to the pure silanes and commercial silane-carbon black preparations in their effectiveness, above all in silicatically filled rubber mixtures. This technical progress is attained surprisingly by the combination of oligomeric and polymeric sulfur-containing organoorganooxysilanes with reinforcer carbon blacks common in rubber.

Other advantages are to be found in the simple and economical preparation of the additives in accordance with the invention and in a rapid dispersion and processing capacity in the rubber mixtures. As a result of the improved heat build-up and the excellent dynamic and physical-mechanical characteristics in silica-filled tire vulcanized materials, an application of the mixtures in accordance with the invention in so-called eco-tires [sic] is possible.

The reinforcement additives in accordance with the invention exhibit a high effectiveness, particularly in vulcanizable, silicatically filled rubbers. Thus, when using the preparations in accordance with the invention in silica-filled rubbers, with a high processing reliability, excellent physical-mechanical coefficients and dynamic characteristics are implied. The clear improvement of stress values and heat build-up takes place, for example, without an impairment of the tear propagation resistances or a reaching of critical values with vulcanization times and elongation values. Such a combination of rubber characteristics is not attainable with the previously known silane-carbon black systems.

EXECUTION EXAMPLES

Preparation of the Mixtures in Accordance with the Invention

Examples 1–18

In a generally common 10-L shear blade mixer FM 10 from the Thyssen Henschel Company with horn-like fluidizing blades as a mixing tool, cooling jacket, and temperature measurement, 1 kg of the carbon black or carbon black mixture to be used were present and the sulfur-containing organoorganooxysilanes to be used were added via an inflow in the lid of the mixer at room temperature within 10 min with nitrogen misting with rotational speeds of 100 to 200 $\text{min}^{-1}$. This was followed by an adsorption time of 8 to 10 min with an rpm<50 $\text{min}^{-1}$. For the adjustment of a narrow particle size distribution in the formed granulated material, shear energy was introduced in short intervals (3 to 5×20 sec) with a rotational speed of 500 $\text{min}^{-1}$. During the entire process, the heat formed by the adsorption of the sulfur-containing organoorganooxysilane on the carbon black and by the introduced shear energy was removed via the cooling jacket. After a total residence time of 20 to 30 min, the mixing apparatus was emptied, and the silane-carbon black reinforcement additives were obtained as flowable, odorless, adhesive-free and nondusting granulated materials with a narrow particle size distribution.

The sulfur-containing oligomeric and polymeric organosilanes used were the following:

A) oligo/poly[4- (2-triethoxysilylethyl)cyclohexane-1,2-diyl]bisoligosulfides of the following general formula:

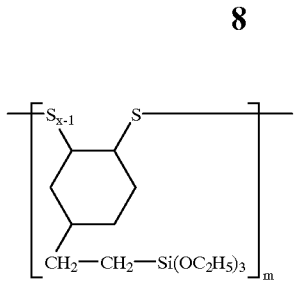

(XI)

x=1 to 8
m=1 to 200
S content: 24 wt %

B) oligo/poly[8,9-bis(triethoxysilyl)-endo-tricyclo[5.2.1.0$^{2.6}$]decane-3,4-diyl]bisoligosulfides of the following general formula:

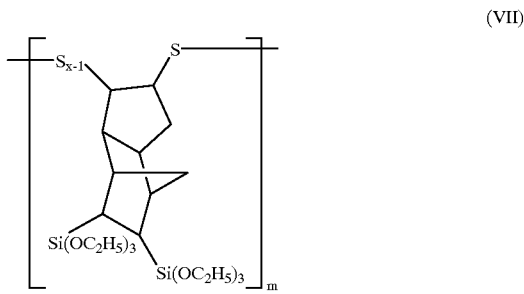

(VII)

x=1 to 8
m=1 to 200
S contnet: 27.3 wt %

C) oligo/poly[5-(triethoxysilyl)bicyclo[2.2.1]heptane-2,3-diyl]bisoligosulfides of the following general formula:

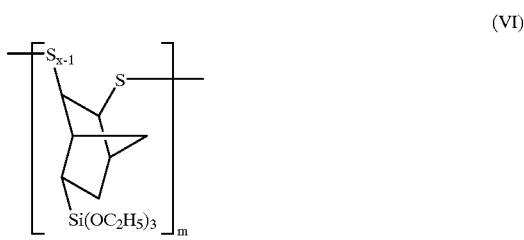

(VI)

D) oligo/poly[1-(trimethoxyethoxysilyl)ethane-1,2-diyl]bisoligosulfides of the following general formula:

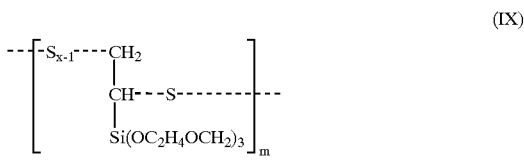

(IX)

x=1 to 8
m=1 to 200
S content: 25.5 wt %

E) oligo/poly[3,3,5,5-(tetraethoxy-4-oxa-3,5-disilaheptane-1,2,6,7-tetrayl]tetrakisoligosulfides of the following general formula:

(X)

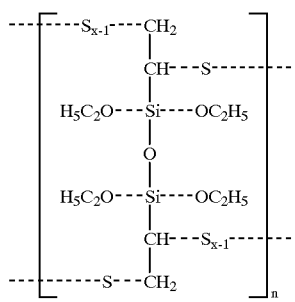

x=1 to 8
m=1 to 20
S contnet: 23.9% wt %

The carbon blacks used were the following:

| Type | | Manufacturer |
|---|---|---|
| F | Statex N 330 | Columbian Carbon Deutschland GmbH |
| G | Corax N 110 | Degussa AG |
| H | Corax N 220 | Degussa AG |
| I | Corax N 330 | Degussa AG |
| K | Elftex 285 (N 550) | Cabot Europa Ltd. |
| L | Elftex 465 (N 330) | Cabot Europa Ltd. |

The additives used for the sulfur-containing organoorganooxysilane were the following:
M Sulfur (dissolved) N 2-[(3-Cyclohexen-1-yl)ethyl]triethoxysilane O 2-(Phenylethyl)triethoxysilane P Tetramethylthiuramdisulfide Starting materials, parameters for the mixing process, and data for the obtained results for Execution Examples 1 to 18 are given in Table I.

TABLE I

| | Starting Material | | | | | Mixing Conditions | | Preparations | |
|---|---|---|---|---|---|---|---|---|---|
| Ex. No. | Silane | Additive | Additive Wt. % | Silane Additive (Kg) | Carbon Black | | Temp °C. | Period of Preheating (min.) | Bulk Density g/cm$^3$ | Particle size distribution wt. %-mm |
| 1 | A | — | — | 1 | F | 1 | 25 | 20 | 0.37 | 90 0.2–1.0 |
| | | | | | | | | | | 9 1.0–2.0 |
| 2 | A | — | — | 1.4 | F | 0.6 | 25 | 20 | 0.41 | 90 0.5–1.4 |
| | | | | | | | | | | 9 1.4–2.0 |
| 3 | A | — | — | 1 | K | 1 | 25 | 25 | 0.20 | 90 1.5–2.5 |
| | | | | | | | | | | 9 2.5–3.5 |
| 4 | A | — | — | 1 | L | 1 | 25 | 22 | 0.16 | 90 0.5–1.4 |
| | | | | | | | | | | 9 1.4–2.0 |
| 5 | A | — | — | 1 | F | 0.5 | 25 | 22 | 0.31 | 90 0.4–1.3 |
| | | | | | L | 0.5 | | | | 8 1.3–2.0 |
| 6 | A | — | — | 1 | F | 0.5 | 25 | 22 | 0.33 | 90 0.4–1.4 |
| | | | | | K | 0.5 | | | | 8 1.4–2.0 |
| 7 | A | — | — | 1 | I | 1 | 25 | 25 | 0.54 | 90 0.5–1.5 |
| | | | | | | | | | | 8 1.5–2.0 |
| 8 | A | — | — | 1 | H | 1 | 25–30 | 25 | 0.58 | 90 1.0–2.0 |
| | | | | | | | | | | 7 2.0–2.5 |
| 9 | A | — | — | 0.7 | I | 1.3 | 25 | 22 | 0.47 | 90 0.5–1.4 |
| | | | | | | | | | | 9 1.5–2.0 |
| 10 | A | — | — | 0.1 | G | 1.9 | 25 | 20 | 0.35 | 90 0.1–0.8 |
| | | | | | | | | | | 7 0.8–2.0 |
| 11 | A | M | 2 | 1 | F | 1 | 25 | 20 | 0.37 | 90 0.2–1.0 |
| | | | | | | | | | | 8 1.0–2.0 |
| 12 | A | N | 5 | 1 | F | 1 | 25 | 20 | 0.37 | 90 0.2–1.0 |
| | | | | | | | | | | 8 1.0.2.0 |
| 13 | A | O | 10 | 1 | L | 1 | 25 | 22 | 0.17 | 90 0.5–1.4 |
| | | | | | | | | | | 8 1.4–2.0 |
| 14 | A | P | 10 | 1 | F | 1 | 25 | 20 | 0.36 | 90 0.2–1.0 |
| | | | | | | | | | | 7 1.0–2.0 |
| 15 | B | — | — | 1 | F | 1 | 25 | 20 | 0.37 | 90 0.5–1.5 |
| | | | | | | | | | | 8 1.5–2.2 |
| 16 | C | — | — | 1 | F | 1 | 25 | 20 | 0.37 | 90 0.1–1.0 |
| | | | | | | | | | | 8 1.0–2.0 |
| 17 | D | — | — | 1 | F | 1 | 25 | 22 | 0.37 | 90 0.2–1.1 |
| | | | | | | | | | | 8 1.1–2.0 |
| 18 | E | — | — | 1 | F | 1 | 25 | 22 | 0.37 | 90 0.3–1.2 |
| | | | | | | | | | | 9 1.2–2.1 |

The prepared silane-carbon black preparations were tested for their effectiveness as reinforcement additives in silica-filled styrene-butadiene rubber mixtures in the indicated composition (data on quantities in parts by weight):
  in each case, in comparison with an 0 mixture, without an addition of silane-carbon black mixtures;
  in comparison with comparative mixtures, which contained the silane used in pure form;

in comparison with rubber mixtures, whose commercially available carbon black-silane preparations were added.

The vulcanized materials were prepared in a two-stage procedure, which is common in the rubber industry. The basic mixture was prepared in a closed mixer and mixed completely on a rolling mill with the addition of crosslinking chemicals. Test specimens were produced by vulcanization in the usual manner from these rubber mixtures.

The raw materials in the vulcanized material preparation were the following:

| Buna Hüls EM 1502 | SBR |
|---|---|
| Buna Hüls EM 1712 | SBR, oil-filled (37.5 parts aromatic mineral oil) |
| Ultrasi VN3 | Precipitated silica |
| Circosol 4240 | Paraffinic mineral oil |
| Q8 Purcell 900P | Paraffinic mineral oil |
| Lipoxol 4000 | Polyethylene glycol |
| Vulkanox HS (TMQ) | 2,2,4-Trimethyl-1,2-dihydroquinoline |
| Vulkanox 4010 NA (IPPD) | N-Isopropyl-N'-phenyl-p-phenylenediamine |
| Vulkanox 4020 (6 PPD) | N-1,3-Dimethylbutyl-N'-phenyl-p-phenylenediamine |
| Vulkacit CZ (CBS) | Benzothiazyl-2-cyclohexylsulfeneamide |
| Vulkacit D (DPG) | Diphenylguanidine |
| Vulkacit NZ (TBBS) | Benzothiazyl-2-tert-butylsulfeneamide |

The test standards for the application-technical investigation were the following:

| Mooney viscosity ML (1 + 4): | DIN 53523 Parts 1–3 |
|---|---|
| $t_{10}$, $t_{90}$: | Din 53523 Part 4 |
| Tensile strength, elongation at break, stress value (modulus), 100%, 200%, 300% (rod and ring): | DIN 53504 |
| Permanent extension: | DIN 53518 |
| Hardness (Shore A): | DIN 53505 |
| Tear propagation resistance: | DIN 53507 |
| Rebound resilience: | DIN 53512 |
| Compression Set: | DIN 53517 |
| Wear: | DIN 53516 |
| Goodrich Flexometer: | DIN 53533 Part 3 |
| Ball crushing according to Martens | |

Recipe I

SBR (Styrene-butadiene rubber) Comparison of 4 rubber mixtures with different quantities of the reinforcement additives according to Example 1 with the corresponding 0 mixture without reinforcement additive.

TABLE II

| Mixture No. | 001 | 002 | 003 | 004 | 005 |
|---|---|---|---|---|---|
| Buna Hüls EM 1502 | 100 | 100 | 100 | 100 | 100 |
| Ultrasil VN3 | 60 | 60 | 60 | 60 | 60 |
| Circosol 4240 | 7.5 | 7.5 | 7.5 | 7.5 | 7.5 |
| Zinc Oxide | 5 | 5 | 5 | 5 | 5 |
| Lipoxol 4000 | 2 | 2 | 2 | 2 | 2 |
| Vulkanox HS | 1 | 1 | 1 | 1 | 1 |
| Stearic Acid | 1.5 | 1.5 | 1.5 | 1.5 | 1.5 |
| Sulfur | 1.6 | 1.6 | 1.6 | 1.6 | 1.6 |
| Vulkacit NZ | 1.6 | 1.6 | 1.6 | 1.6 | 1.6 |
| Vulkacit D | 0.8 | 0.8 | 0.8 | 0.8 | 0.8 |
| Carbon Black F | — | — | — | — | — |
| Additive according to Example 1 | — | 3.0 | 6.0 | 9.0 | 12.0 |
| Total | 181 | 184 | 187 | 190 | 193 |

Vulcanization Characteristics of the Mixtures According to Recipe I

TABLE III

| Mixture No. | 001 | 002 | 003 | 004 | 005 |
|---|---|---|---|---|---|
| Mooney-Viscosity ML (1 + 4)100° C. | 81 | 77 | 81 | 82 | 82 |
| Curemeter 160° C. | | | | | |
| $t_{10}$ (min) | 12.6 | 9.6 | 8.2 | 7.1 | 6.3 |
| $t_{90}$ (min) | 19.1 | 16.6 | 14.8 | 13.5 | 12.8 |
| $t_{90}$–$t_{10}$ (min) | 5.5 | 7.0 | 6.6 | 6.4 | 6.5 |
| Vulcanization 30 min 160° C. | 67 | 67 | 73 | 74 | 76 |
| Hardness (Shore A) | | | | | |
| Tensile Strength (MPa) | 9.0 | 14.8 | 22.6 | 26.5 | 25.8 |
| Modulus 100% (MPa) | 1.3 | 1.8 | 2.5* | 3.3 | 3.5 |
| Modulus 200% (MPa) | 1.9 | 3.4 | 5.5 | 7.7 | 8.9 |
| Modulus 300% (MPa) | 2.7 | 5.9 | 10.3 | 14.0 | 15.7 |
| Elongation at Break (%) | 672 | 612 | 488 | 471 | 417 |
| Tear Propagation Resistance (N/mm) | 16 | 20 | 18 | 17 | 16 |
| Rebound resilience (%) | 43 | 43 | 44 | 44 | 43 |
| Compression Set 72 h 70° C. (%) | 29 | 30 | 24 | 22 | 22 |
| Wear (mm$^3$) | 278 | 162 | 145 | 127 | 119 |
| Goodrich-Flexometer Method 1 | 53 | 35 | 39 | 40 | 41 |
| ΔT after 25 min (° C.) | | | | | |
| Flow after 25 min (%) | −10.5 | −3.0 | −2.4 | −2.0 | −1.5 |
| Permanent set (%) | 12.7 | 5.2 | 6.0 | 4.8 | 4.1 |

By using the reinforcement additives in accordance with the invention, the starting vulcanization times were shortened with the increasing fraction of the additives, wherein they did not drop below critical orders of magnitude. Unexpectedly, the Mooney viscosity remained almost constant and the vulcanization time rose slightly.

The physical-mechanical and dynamic coefficients of the vulcanized materials obtained exhibited improvements by several orders of magnitude in the presence of the preparations in accordance with the invention. It is of particular interest that despite a clearly positive development of the tensile strength, moduli, hardness, compression set, wear, and Flexometer values, the tear propagation resisance was also positive and the rebound resilience remained practically uninfluenced.

Recipe II
SBR tire mixture

Comparison of 6 typical rubber mixtures of passenger vehicle tires with different compositions with the reinforcement additives in accordance with the invention (Examples 1, 4, and 7) with the corresponding 0 mixture without a reinforcement additive. The carbon black types and the quantities of the additives in accordance with the invention, based on rubber and filler fractions, were thereby varied.

TABLE IV

| Mixture No. | 006 | 007 | 008 | 009 | 010 | 011 | 012 |
|---|---|---|---|---|---|---|---|
| Buna Hüls EM 1712 | 137.5 | 137.5 | 137.5 | 137.5 | 137.5 | 137.5 | 137.5 |
| Ultrasil VN3 | 75 | 75 | 75 | 75 | 75 | 75 | 75 |
| Q8 Purcell 900 P | — | 2.5 | 5 | 2.5 | 5 | 2.5 | 5 |
| Zinc Oxide | 5 | 5 | 5 | 5 | 5 | 5 | 5 |
| Stearic Acid | 1.5 | 1.5 | 1.5 | 1.5 | 1.5 | 1.5 | 1.5 |
| Koresin-Resin | 2 | 2 | 2 | 2 | 2 | 2 | 2 |
| Vulkanox 4010 NA | 1 | 1 | 1 | 1 | 1 | 1 | 1 |
| Vulkanox 4020 | 1 | 1 | 1 | 1 | 1 | 1 | 1 |
| Sulfur | 1.6 | 1.6 | 1.6 | 1.6 | 1.6 | 1.6 | 1.6 |
| Vulkacit NZ | 1.6 | 1.6 | 1.6 | 1.6 | 1.6 | 1.6 | 1.6 |
| Vulkacit D | 1.2 | 1.2 | 1.2 | 1.2 | 1.2 | 1.2 | 1.2 |
| Carbon Black F | — | — | — | — | — | — | — |
| Additive according to the invention | | | | | | | |
| Preparation Example 1 | — | 6 | 12 | — | — | — | — |
| Preparation Example 4 | — | — | — | 6 | 12 | — | — |
| Preparation Example 7 | — | — | — | — | — | 6 | 12 |
| Total | 227.4 | 235.9 | 244.4 | 235.9 | 244.4 | 235.9 | 244.4 |

Vulcanization Characteristics of the Mixtures According to Recipe II

TABLE V

| Mixture No. | 006 | 007 | 008 | 009 | 010 | 011 | 012 |
|---|---|---|---|---|---|---|---|
| Mooney-Viscosity ML (1 + 4) 100° C. | 87 | 73 | 64 | 75 | 71 | 72 | 68 |
| Cure meter 160° C. | | | | | | | |
| $\tau_{10}$ (min) | 1.2 | 8.1 | 7.3 | 8.1 | 6.6 | 8.6 | 7.0 |
| $\tau_{90}$ (min) | 44.2 | 26.0 | 19.1 | 23.9 | 17.9 | 24.0 | 18.2 |
| $\tau_{90}-\tau_{10}$ (min) | 43 | 17.9 | 11.8 | 15.8 | 11.3 | 15.4 | 11.2 |
| Vulkanisation 30 min 160° C. Hardness (Shore A) | 48 | 56 | 60 | 55 | 61 | 54 | 61 |
| (MPa) Tensile Strength | 5.3 | 13.2 | 15.7 | 13.7 | 17.0 | 12.9 | 17.0 |
| Modulus 100% (MPa) | 0.6 | 1.0 | 1.4 | 1.0 | 1.65 | 1.0 | 1.6 |
| Modulus 200% (MPa) | 0.8 | 8.0 | 3.3 | 2.1 | 3.8 | 2.0 | 3.8 |
| Modulus 300% (MPa) | 1.2 | 3.6 | 6.03 | 3.80 | 7.0 | 3.5 | 6.8 |
| Elongation of Break (%) | 1054 | 756 | 633 | 747 | 611 | 747 | 626 |
| Tear Propagation Resistance (N/mm) | 19 | 25 | 23 | 24 | 20 | 27 | 20 |
| Rebound Resilience (%) | 39 | 39 | 38 | 40 | 39 | 40 | 39 |
| Wear (mm³) (*) | (*) | 275 | 226 | 281 | 173 | 264 | 157 |
| Goodrich-Flexometer, Method 1 | | | | | | | |
| ΔT after 25 min (° C.) | (*1) | 41 | 31 | 41 | 29 | 41 | 29 |
| Flow after 25 min (%) | (*1) | −5.9 | −1.1 | −6.0 | −0.8 | −5.5 | −1.0 |
| Permanent Set (%) | (*1) | 8.7 | 3.1 | 8.7 | 2.4 | 8.7 | 2.4 |
| Ball Crushing after Martens | | | | | | | |
| 150 N (° C.) | 120 | 142 | 111 | 138 | 103 | 139 | 105 |
| 200 N (° C.) | 5 | 13 (*2) | 157 | 203 | 145 | 14.8 (*2) | 147 |
| 250 N (° C.) | — | — | 186 | — | 178 | — | 181 |
| 300 N (° C.) | — | — | 3 (*2) | — | 3 (*2) | — | 3 (*2) |

(*) Not measurable - sample too soft
(*1) Not measurable - definition too high
(*2) Destruction of sample The reinforcement additives in accordance with the invention brought about a clear improvement in almost all the physical-mechanical and dynamic parameters in the tire mixtures. In spite of the high reinforcer effect by the preparations in accordance with the invention, the starting and completing vulcanization times and the elongation at break did not fall below critical orders of magnitude.

Surprisingly, the tear propagation resistance also did not fall below the value of the zero mixture, as was otherwise common with, with a higher metering of the reinforcement preparation.

On the basis of the clearly improved heat build-up (ball crushing and the reduced surface tension of the obtained rubber samples, caused by the content of silica, recipes of this type are also suitable for the development of eco-tires.

Recipe III
SBR test mixture

Comparison of rubber mixtures without a silane fraction, with free silane, and with the reinforcement additive in accordance with the invention.

TABLE VI

| Mixture No. | 013 | 014 | 015 |
|---|---|---|---|
| Buna Hüls EM 1502 | 100 | 100 | 100 |
| Zinc Oxide | 5 | 5 | 5 |
| Stearic Acid | 2 | 2 | 2 |
| Ultrasil VN3 | 50 | 50 | 50 |
| Diethylene glycol | 3 | 3 | 3 |
| Vulkacit CZ | 1.2 | 1.2 | 1.2 |
| Vulkacit D | 1.0 | 1.0 | 1.0 |
| Sulfur | 2.0 | 2.0 | 2.0 |
| Carbon Black F | — | — | — |
| Oligo-[4-(2-triethoxysilylethyl)-cyclohexane-1,2-diyl]bisoligosulfid (S-content: 24%) | — | 2 | — |
| Inventive Additive According to Ex. 1 | — | — | 4 |
| Total | 164.2 | 166.2 | 168.2 |

Vulcanization Characteristics of the Mixtures According to Recipe III

TABLE VII

| Mixture No. | 013 | 014 | 015 |
|---|---|---|---|
| Mooney-Viscosity ML (1 + 4) 100° C. | 81 | 75 | 79 |
| Curemeter 150° C. | | | |
| $t_{10}$ (min) | 19.3 | 14.8 | 15.2 |
| $t_{90}$ (min) | 27.0 | 23.4 | 24.6 |
| $t_{90} - t_{10}$ (min) | 7.7 | 8.6 | 9.4 |
| Vulkanization 35 min 150° C. | 65 | 71 | 73 |
| Hardness (Shore A) | | | |
| Tensile Strength | 12.4 | 13.7 | 13.9 |
| Modulus 300% (MPa) | 3.7 | 7.2 | 9.8 |
| Elongation at break (%) | 611 | 465 | 413 |
| Elongation at set (%) | 30 | 17 | 15 |
| Rebound Resilience (%) | 43 | 44 | 45 |
| Wear (mm³) | 156 | 92 | 82 |
| Goodrich-Flexometer Method 1 | 38 | 26 | 24 |
| Δ after 25 min (° C.) | | | |
| Flow after 25 min (%) | −1.04 | 0.06 | 0.334 |
| Permanent set (%) | −4.2 | 0.2 | 1.3 |

In a comparison of the coefficients of the vulcanizate, using the reinforcement additives in accordance with the invention, with the vulcanized material, which contained the corresponding pure silane, a clear superiority of the silane-carbon black preparation in accordance with the invention is exhibited. All vulcanization characteristics tested, with the natural exception of the elongation at break, were clearly improved when using the silane-carbon black mixture of the invention in comparison to the pure silane.

Recipe IV
SBR

Comparison of rubber mixtures without silane fraction with the silane-carbon black preparation in accordance with the invention according to Example 7 and a silane-carbon black preparation, prepared (according to West German Patent No. 2,747,277) from the carbon black Corax N 330 and the commercially available, monomeric sulfur-containing silane bis[3-triethoxysilylpropyl]tetrasulfide (Si 69 from the Degussa Company, Frankfurt) in the mass ratio 50:50.

TABLE VIII

| Mixture No. | 016a | 017 | 018 |
|---|---|---|---|
| Buna Hüls EM 1502 | 100 | 100 | 100 |
| Ultrasil VN3 | 60 | 60 | 60 |
| Circosol 4240 | 7.5 | 7.5 | 7.5 |
| Zinc Oxide | 5 | 5 | 5 |
| Lipoxol 4000 | 2 | 2 | 2 |
| Vulkanox HS | 1 | 1 | 1 |
| Stearic Acid | 1.5 | 1.5 | 1.5 |
| Sulfur | 1.6 | 1.6 | 1.6 |
| Vulkacit NZ | 1.6 | 1.6 | 1.6 |
| Vulkacit D | 0.8 | 0.8 | 0.8 |
| Carbon black-Silane preparation Corax N 330 and Bis-(3-triethoxysilylpropyl)tetrasulfid in a 50:50 weight ratio | — | 9.0 | — |
| Inventive Carbon black additive according to Example 7 | — | — | 9.0 |
| Total | 181 | 190 | 190 |

Vulcanization Characteristics of the Mixtures According to Recipe IV

TABLE IX

| Mixture No. | 016 | 017 | 018 |
|---|---|---|---|
| Mooney-Viscosity ML (1 + 4) 100° C. | 81 | 80 | 82 |
| Curemeter 160° C. | | | |
| $t_{10}$ (min) | 12.9 | 7.2 | 7.3 |
| $t_{90}$ (mim) | 19.1 | 13.8 | 14.0 |
| $t_{90} - t_{10}$ (min) | 5.2 | 6.6 | 6.7 |
| Vulkanisation 30 min 160° C. | 67 | 74 | 75 |
| Hardness (Shore A) | | | |
| Tensile strength (MPa) | 9.0 | 23.9 | 26.6 |
| Modulus 300% (MPa) | 2.5 | (14.0)* | 14.2 |
| Elongation at break (%) | 675 | 319 | 368 |
| Tear propogation resistance (N/mm) | 16 | 14 | 17 |
| Compression set 72 h 100° C. (%) | 66 | 53 | 49 |
| Wear (mm³) | 280 | 136 | 127 |
| Goodrich-Flexometer, Method 1 | 53 | 36 | 37 |
| ΔT after 25 min (° C.) | | | |
| Flow after 25 min (%) | −10.5 | −1.1 | −1.8 |
| Permanent set (%) | 12.8 | 3.6 | 3.5 |

*Defective, since elongation at break was 319%

A comparison of mixtures 017 and 018 shows that considerable improvements, in comparison with the state of the art, were attained with the reinforcement additives in accordance with the invention. Whereas the Flexometer exhibited comparable values, the curemeter data indicated a higher processing reliability when using the preparations in accordance with the invention. On the basis of physical-mechanical coefficients, such as wear and compression set, but above all, tear propagation resistance, elongation at break, and tensile strength, the advantages of the new preparations are clearly visible.

Reinforcement additives

What is claimed is:

1. A reinforcement additive, comprising a mixture of:

a) 5 to 70 parts by weight of one or more oligomeric and/or polymeric silanes of the formula:

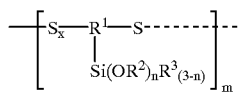
(I)

wherein R¹ is a saturated or unsaturated, branched or unbranched, substituted or unsubstituted at least trivalent hydrocarbon group having 2–20 carbon atoms, containing at least two carbon-sulfur bonds, R² and R³ are, independently, saturated or unsaturated, branched or unbranched, substituted or unsubstituted hydrocarbon groups having 1–20 carbon atoms, halogen, hydroxy, hydrogen or a group of the formula (II) or (III):

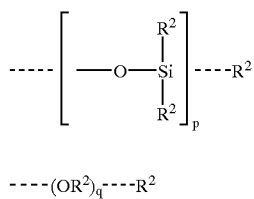

(II)

(III)

wherein R² is as defined above and n=1–3, m=1–1,000, p=1–15, q=1–3 and x=1–8; and b) 30–95 parts by weight of semiactive, active or highly active carbon black.

2. The additive of claim 1, wherein said silane is an oligo/poly(4-(2-trialkoxysilylethyl)cyclohexane-1,2-diyl) bisoligosulfide of the formula:

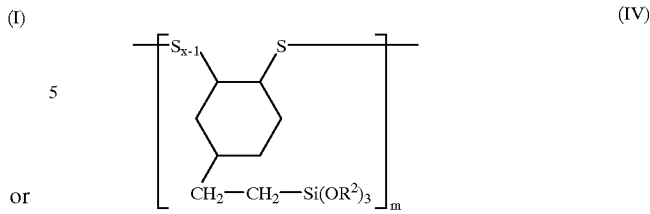

(IV)

wherein R², m and x are as defined above.

3. The additive of claim 1, further comprising up to 20 parts by weight of an organo-oxysilane of the formula:

(V)

wherein R², R³ and n are as defined above and R⁴ is an unsaturated, branched or unbranched, substituted or unsubstituted hydrocarbon having 2–20 carbon atoms and containing at least one carbon—carbon olefinic or aromatic double bond.

4. The additive of claim 3, wherein said organooxysilane is a 2-((3-cyclohexene-1-yl)ethyl)trialkoxysilane or 2-(phenylethyl)trialkoxysilane.

5. The additive of claim 1, further comprising free sulfur.

6. The additive of claim 1, comprising 40–60 parts by weight of component (a) and 60–40 parts by weight of component (b).

7. A rubber or plastic mixture, comprising rubber or plastic and the additive of claim 1.

8. The mixture of claim 7, further comprising a silicate filler.

9. The mixture of claim 7, further comprising precipitated silica.

10. A method of preparing the additive of claim 1, comprising the step of:

mixing component (a) and component (b) until said silane is adsorbed onto said carbon black, producing a non-adhesive granulated additive.

* * * * *